US011622195B2

United States Patent
Tachi et al.

(10) Patent No.: US 11,622,195 B2
(45) Date of Patent: Apr. 4, 2023

(54) ACTIVE NOISE CONTROL SYSTEM UTILIZING NOISE CANCELLATION SOUNDS

(71) Applicants: ALPS ALPINE CO., LTD., Tokyo (JP); A School Corporation Kansai University, Suita Osaka (JP)

(72) Inventors: Ryosuke Tachi, Iwaki Fukushima (JP); Yoshinobu Kajikawa, Suita Osaka (JP)

(73) Assignees: ALPS ALPINE CO., LTD., Tokyo (JP); A SCHOOL CORPORATION KANSAI UNIVERSITY, Osaka (JP)

( * ) Notice: Subject to any disclaimer, the term of this patent is extended or adjusted under 35 U.S.C. 154(b) by 0 days.

(21) Appl. No.: 17/363,228

(22) Filed: Jun. 30, 2021

(65) Prior Publication Data

US 2022/0007109 A1 Jan. 6, 2022

(30) Foreign Application Priority Data

Jul. 3, 2020 (JP) ............................. JP2020-115475

(51) Int. Cl.
G10K 11/178 (2006.01)
H04R 3/04 (2006.01)
(Continued)

(52) U.S. Cl.
CPC ............ H04R 3/04 (2013.01); B60R 11/0217 (2013.01); B60R 11/0247 (2013.01);
(Continued)

(58) Field of Classification Search
None
See application file for complete search history.

(56) References Cited

U.S. PATENT DOCUMENTS

2009/0097679 A1* 4/2009 Maeda ...................... H04S 7/30
  381/302
2010/0124337 A1  5/2010 Wertz et al.
  (Continued)

FOREIGN PATENT DOCUMENTS

EP  1 577 879 B1  7/2008

OTHER PUBLICATIONS

European Search Report dated Nov. 18, 2021 in corresponding European Application No. 21181479.

Primary Examiner — James K Mooney
(74) Attorney, Agent, or Firm — Crowell & Moring, L.L.P.

(57) ABSTRACT

Adaptive operations of a first noise control system and a second noise control system may include a speaker that outputs noise cancellation sound, a microphone that detects an error signal, an auxiliary filter that generates, from a noise signal, a correction signal that corrects the error signal so that a difference in a position between the microphone and a noise cancellation position is compensated, and an adaptive filter that performs an adaptive operation using the corrected error signal to generate the noise cancellation sound from the noise signal are alternately performed. A transfer function learned in a state in which the second noise control system is stopped is set in the auxiliary filter of the first noise control system, and a transfer function learned in a state in which the adaptive operation of the first noise control system is stopped is set in the auxiliary filter of the second noise control system.

15 Claims, 10 Drawing Sheets

(51) Int. Cl.
*B60R 11/02* (2006.01)
*H04R 3/00* (2006.01)
*H04R 3/12* (2006.01)
*H04R 5/04* (2006.01)
*H04S 7/00* (2006.01)

(52) U.S. Cl.
CPC .. *G10K 11/17854* (2018.01); *G10K 11/17879* (2018.01); *H04R 3/005* (2013.01); *H04R 3/12* (2013.01); *H04R 5/04* (2013.01); *H04S 7/303* (2013.01); *H04S 7/307* (2013.01); *H04R 2499/13* (2013.01); *H04S 2420/01* (2013.01)

(56) References Cited

U.S. PATENT DOCUMENTS

2017/0270906 A1* 9/2017 Kwatra .................... H04R 3/12
2020/0211526 A1* 7/2020 Tachi ............... G10K 11/17854

* cited by examiner

FIG. 8A1
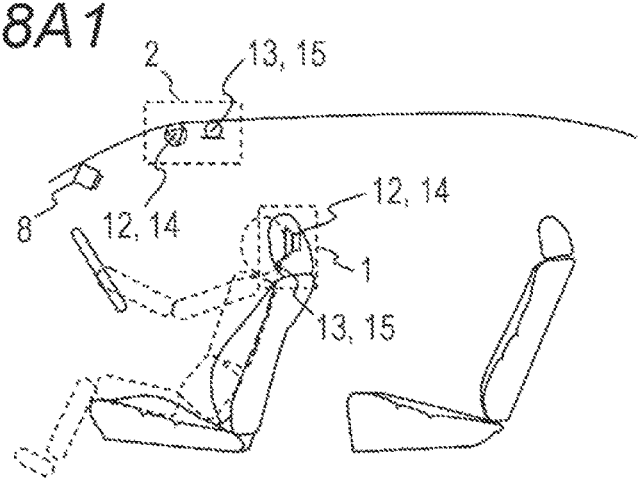
FIG. 8A2
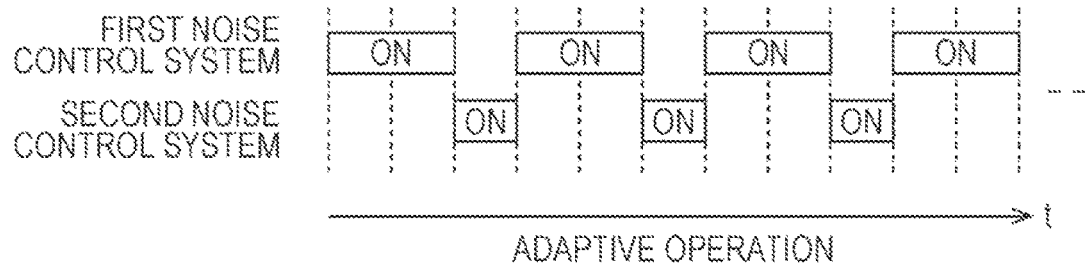
FIG. 8B1
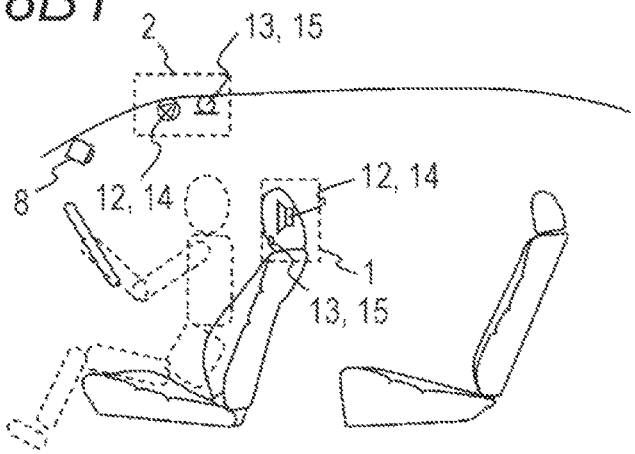
FIG. 8B2
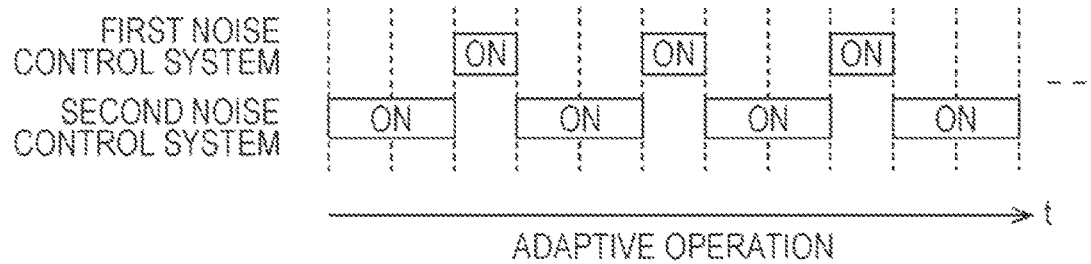

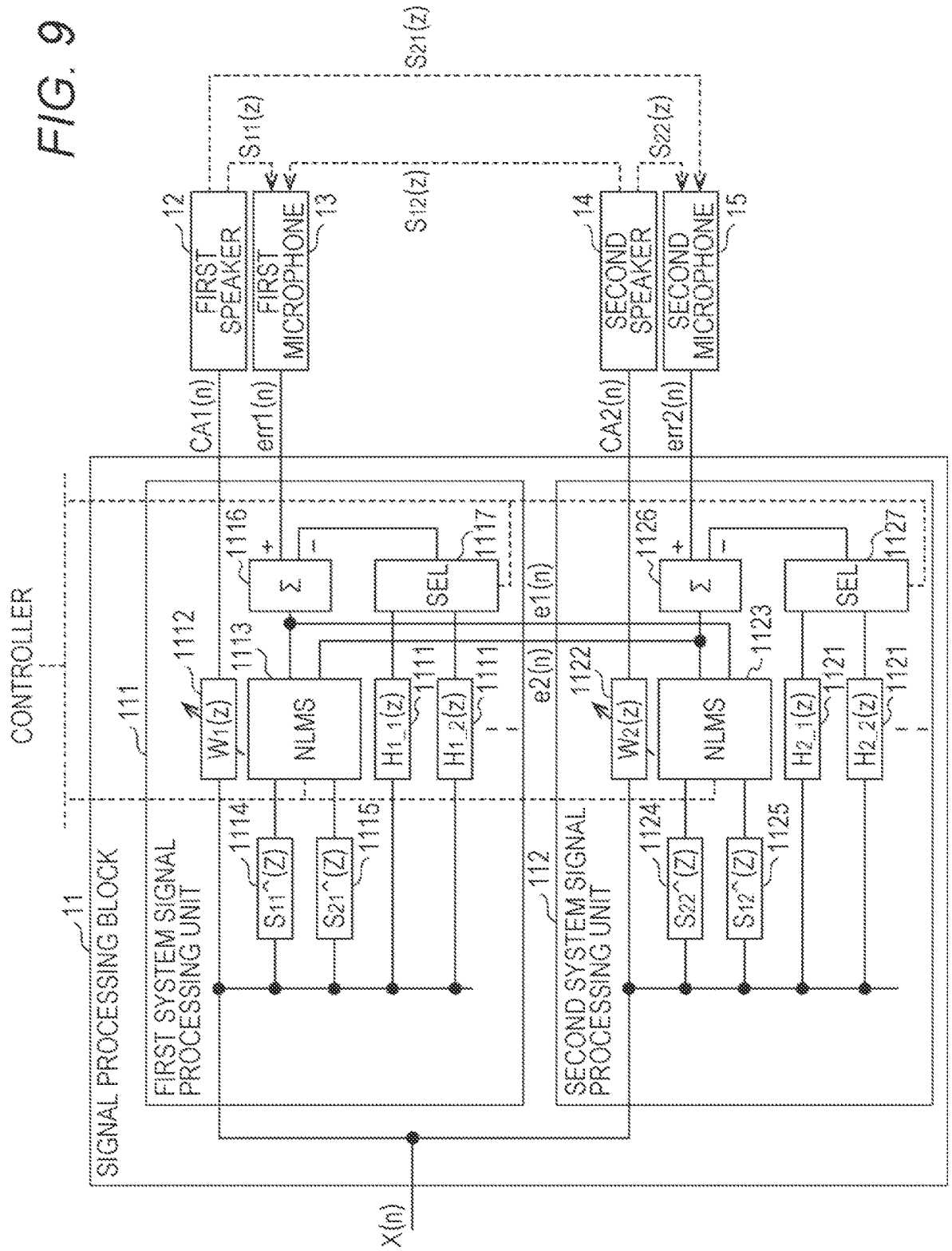

ACTIVE NOISE CONTROL SYSTEM UTILIZING NOISE CANCELLATION SOUNDS

RELATED APPLICATIONS

The present application claims priority to Japanese Patent Appln. No. 2020-115475, filed Jul. 3, 2020, the entire disclosure of which is hereby incorporated by reference.

BACKGROUND OF THE DISCLOSURE

Field of the Disclosure

The present disclosure relates to a technology of active noise control (ANC) capable of reducing noise by emitting noise cancellation sound which cancels noise.

Description of the Related Art

Active noise control technology may reduce noise by emitting a noise canceling sound that cancels the noise. Some active noise control technologies utilize a microphone and a speaker that are disposed near a noise canceling position, a transfer function simulation filter that applies a transfer function simulating a transfer function from the speaker to the microphone to the output signal of the noise source or a signal imitating the output signal, and an adaptive filter that generates a noise canceling sound that is output from the speaker from the output of the transmission function simulation filter. These elements provide the ability to adaptively set the transfer function of the adaptive filter as an error signal by correcting the output of the microphone with an auxiliary filter (for example, JP 2018-72770 A).

In this technology, a transfer function that corrects a difference between the transfer function from the noise source to the noise cancellation position and the transfer function from the noise source to the microphone and a difference between the transfer function from the speaker to the noise cancellation position and the transfer function from the speaker to the microphone is set in the auxiliary filter. By using such an auxiliary filter, it becomes possible to cancel the noise at the noise cancellation position different from the position of the microphone.

When a speaker that emits noise cancellation sound is placed near a seat to cancel noise heard by a user sitting in the seat, if there is a change in a user's posture, the noise cancellation sound is diffracted or a change of noise cancellation sound by distance attenuation, so it may not be possible to cancel the noise heard by the user satisfactorily.

Therefore, it is conceivable to arrange a plurality of sets of speakers and microphones at different positions so that the noise cancellation sound can reach satisfactory at a position of an ear even if the user's ear moves. However, since a transfer path from each speaker to each microphone can become increasly complicated, the number of transfer function simulation filters required also increases. Further, when the transfer function simulation filter is constructed by the signal processing of a digital signal processor (DSP), the processing load of the DSP becomes excessive.

Therefore, an object of the present disclosure is to provide an active noise control system capable of satisfactorily canceling noise with a relatively small amount of processing even if a user's posture or the like changes.

SUMMARY

To address the above problems, according to implementations of the present disclosure, an active noise control system that reduces noise includes a plurality of noise control systems and a controller (also referred to as a control unit). Here, each noise control system has one or more noise control lines. Further, each noise control line has a speaker that outputs noise cancellation sound, a microphone that detects an error signal, an auxiliary filter corresponding to a noise cancellation position, and an adaptive filter. In addition, auxiliary filters of each noise control line generate, from a noise signal representing the noise, a correction signal that corrects the error signal detected by the microphone so that a difference between the noise cancellation position corresponding to the auxiliary filter and a position of the microphone is compensated, and the adaptive filters of each noise control line perform adaptive operations using each error signal corrected by the correction signals generated by the auxiliary filters of each noise control line of the same noise control system as the noise control line, and generates the noise cancellation sound from the noise signal. Further, the speakers of each noise control line of each noise control system are disposed at different positions from each other. Then, the controller alternately performs the adaptive operations of the adaptive filters of each noise control line of each noise control system so that the adaptive operations of the adaptive filters of different noise control systems are not performed at the same time, and the adaptive operations of the adaptive filters of each noise control line of the same noise control system are performed at the same time.

Here, such an active noise control system may include two noise control systems, a first noise control system and a second noise control system, as the plurality of noise control systems. Then, in a state in which an output of the noise cancellation sounds from the speakers of each noise control line of the second noise control system is stopped under a predetermined standard environment, a transfer function that generates, from the noise signal, the correction signal that corrects the error signal detected by a microphone may be preset in the auxiliary filters of each noise control line of the first noise control system so that the difference in the position between the microphone of the noise control line and the noise cancellation position corresponding to the auxiliary filter is compensated, and in a state in which the adaptive operations of the adaptive filters of each noise control line of the first noise control system are stopped and the transfer function of the adaptive filter is fixed to a predetermined transfer function under the standard environment, the transfer function that generates, from the noise signal, the correction signal that corrects the error signal detected by the microphone may be preset in the auxiliary filters of each noise control line of the second noise control system so that the difference in the position between the microphone of the noise control system and the noise cancellation position corresponding to the auxiliary filter is compensated.

Alternatively, such an active noise control system may include two noise control systems, a first noise control system and a second noise control system, as the plurality of noise control systems, and each of the noise control system may include two noise control lines, a first noise control line and a second noise control line. Then, the active noise control system may be mounted on a vehicle, the noise cancellation position corresponding to the auxiliary filter of the first noise control line may be set to a position of a right ear of a standard human body seated in a predetermined seat of the vehicle, and the noise cancellation position corresponding to the auxiliary filter of the second noise control line may be set to a position of a left ear of the standard human body seated in the predetermined seat of the vehicle.

Alternatively, such an active noise control system may include two noise control systems, a first noise control system and a second noise control system, as the plurality of noise control systems. Then, the active noise control system may be mounted on the vehicle, the active noise control system may reduce noise heard by the user seated in a predetermined seat of the vehicle, each noise control line of the first noise control system and the second noise control system may include a plurality of auxiliary filters that correspond to different noise cancellation positions and a selector that selects a correction signal generated by one of the plurality of auxiliary filters as a correction signal used for correction of the error signal, and with respect to each noise control line, in the controller, the selector selects a correction signal generated by an auxiliary filter corresponding to a noise cancellation position that matches a position of a head of the user seated in the seat.

In implementations of an active noise control system as described above, since a plurality of noise control systems having different speaker positions are used, even if the diffraction of the noise cancellation sound of one of the noise control systems or the distance attenuation of the noise cancellation sound changes due to the change in the user's posture or the like, it is possible to satisfactorily cancel the noise heard by the user.

In addition, in each noise control system, the interference between the adaptive operations between the noise control systems is eliminated by a relatively simple configuration and processing that alternately performs only the adaptive operations that do not consider the path between other noise control systems, so each noise control system can be properly adapted to cancel the noise heard by the user.

Here, as described above, the first noise control system and the second noise control system are provided, in order to reduce the noise heard by the user seated in the predetermined seat of the vehicle. The active noise control system includes a detection unit that detects the position of the head of the user seated in the predetermined seat, the controller may alternatively execute the adaptive operations of the adaptive filters of each noise control system so that an execution period of the adaptive operation of the adaptive filter of the second noise control system becomes longer and the execution period of the adaptive operation of the adaptive filter of the first noise control system becomes short when the position of the head of the user detected by the detection unit is in a second region near the speaker of the second noise control system rather than when the position of the head of the user is in a first region near the speaker of the first noise control system.

Further, as described above, the first noise control system and the second noise control system are provided, in order to reduce the noise heard by the user seated in the predetermined seat of the vehicle, the detection unit that detects the position of the head of the user seated in the predetermined seat is provided, and the controller may control a step size of the adaptive filter of the second noise control system so that a step size of the adaptive filter of the second noise control system that determines a gain of a transfer function of the adaptive filter in the adaptive operation of the adaptive filter becomes larger and a step size of the adaptive filter of the first noise control system becomes smaller when the position of the head of the user detected by the detection unit is in a second region near the speaker of the second noise control system rather than when the position of the head of the user is in a first region near the speaker of the first noise control system.

As a result, it becomes possible to more appropriately and promptly adapt the noise control system that is effective by canceling the noise heard by the user among the plurality of noise control systems.

Further, as described above, when the first noise control system and the second noise control system are provided to reduce the noise heard by the user seated in the predetermined seat of the vehicle, the speakers of the first noise control line and the second noise control line may be disposed in the predetermined seat, and the speakers of the first noise control line and the second noise control line of the second noise control system may be disposed on a ceiling of the passenger compartment of the vehicle in front of the predetermined seat.

Further, as described above, the first noise control system and the second noise control system are provided, in order to reduce the noise heard by the user seated in the predetermined seat of the vehicle, in a state in which the output of noise cancellation sound from the speaker of the second noise control system is stopped under the predetermined standard environment, the transfer function that generates, from the noise signal, the correction signal that corrects the error signal detected by the microphone may be preset in the auxiliary filters of each noise control line of the first noise control line and the second noise control line of the first noise control system so that the difference in the position between the microphone of the noise control line and the noise cancellation position corresponding to the auxiliary filter is compensated, and in a state in which the adaptive operations of the adaptive filters of the first noise control system are stopped and the transfer function of the adaptive filter is fixed to a predetermined transfer function under the standard environment, the transfer function that generates, from the noise signal, the correction signal that corrects the error signal detected by the microphone may be preset in the auxiliary filters of each noise control line of the second noise control system so that the difference in the position between the microphone of the noise control system and the noise cancellation position corresponding to the auxiliary filter is compensated.

As described above, according to implementations of the present disclosure, it is possible to provide an active noise control system capable of satisfactorily canceling noise with a relatively small amount of processing even if a user's posture changes or the like.

BRIEF DESCRIPTION OF THE DRAWINGS

FIG. 8A1, FIG. 8A2, FIG. 8B1, and FIG. 8B2 are diagrams illustrating another adaptive operation of the active noise control system according to one form of the present disclosure;

FIG. 9 is a diagram illustrating another configuration example of the active noise control system according to one form of the present disclosure.

DESCRIPTION OF THE DRAWINGS

Figure 1:
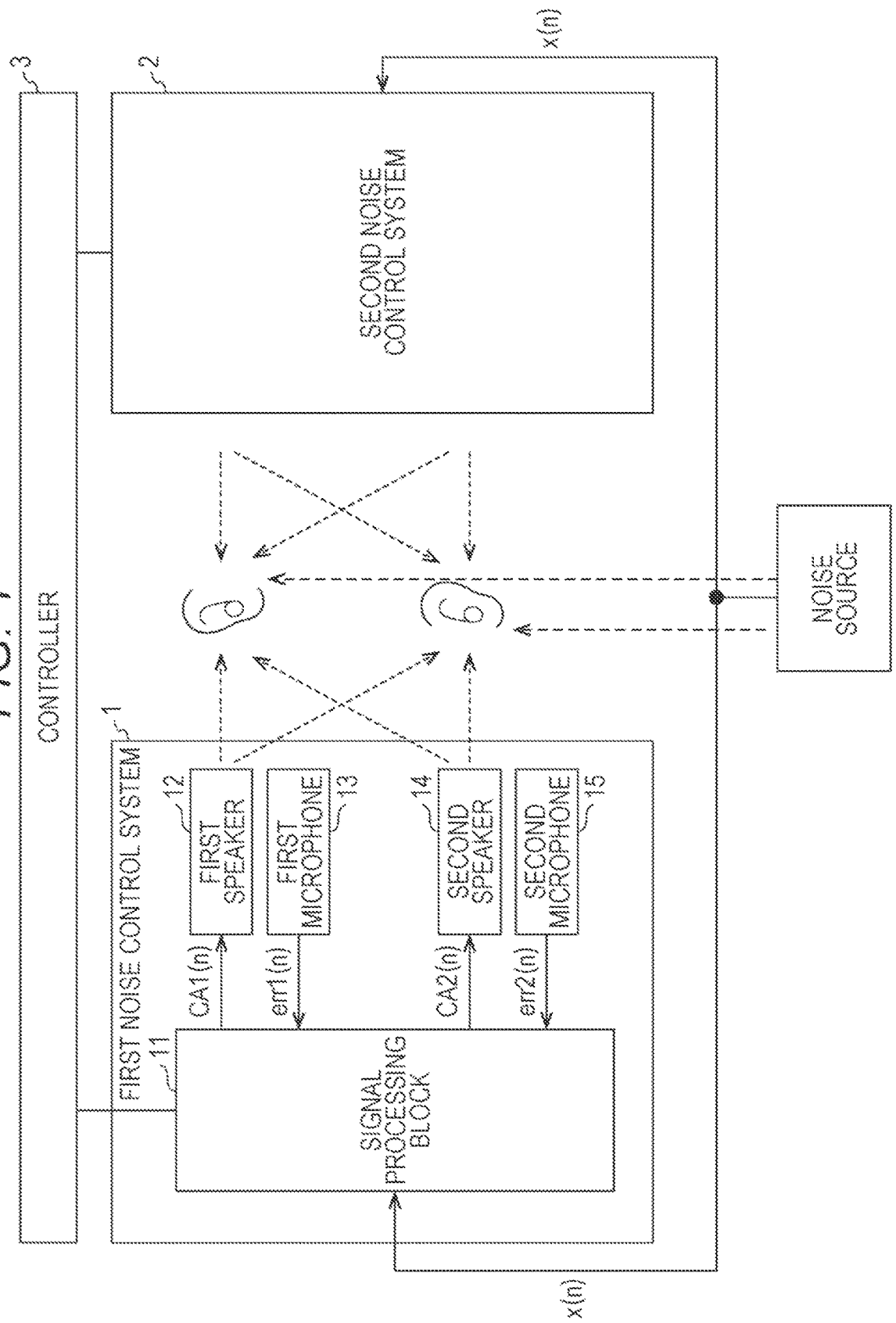
FIG. 1 is a block diagram illustrating one form of a configuration of an active noise control system according to the present disclosure.

FIG. 1 illustrates a configuration of an active noise control system according to one form the present disclosure.

As illustrated, the active noise control system includes a first noise control system 1, a second noise control system 2, and a controller 3.

Here, the active noise control system according to one form the present disclosure is a system that is mounted on a vehicle, and cancels noise generated from noise sources in two cancel points, respectively, with a position of a standard right ear of a user seated in a seat targeted for noise cancellation of the vehicle as a first cancel point and a position of a standard left ear of the user as a second cancel point.

The first noise control system 1 and the second noise control system 2 have the same configuration, and include a signal processing block 11, a first speaker 12, a first microphone 13, a second speaker 14, and a second microphone 15, respectively.

Figure 2A:
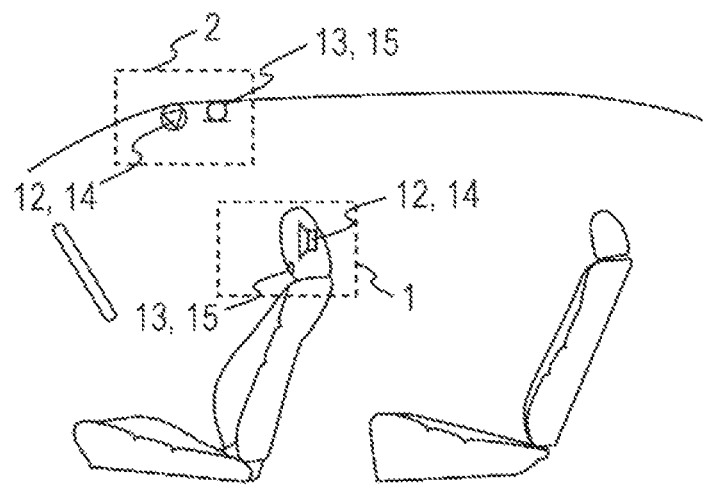
FIG. 2A and FIG. 2B are diagrams illustrating a disposition of a speaker and a microphone of the active noise control system according to one form of the present disclosure.
Figure 2B:
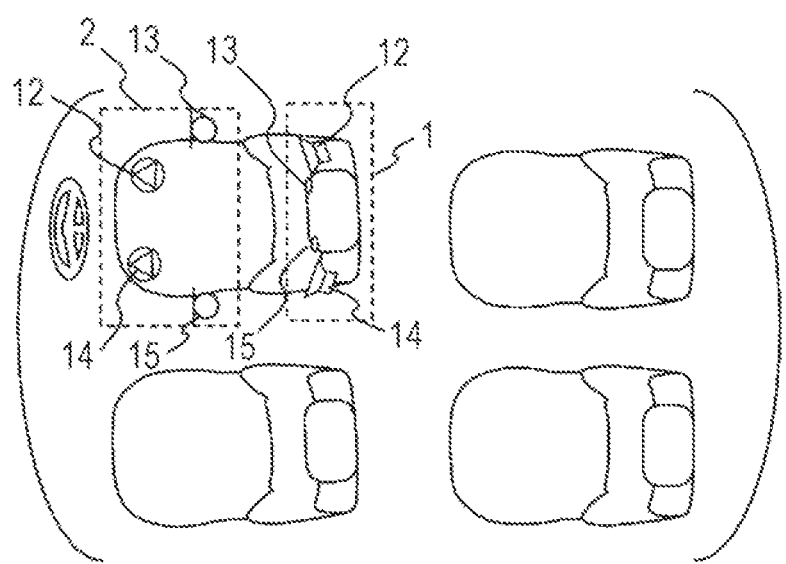

However, as illustrated in FIGS. 2A and 2B, in the first noise control system 1 and the second noise control system 2, the disposition of the microphone and the speaker is different, and the first speaker 12 and the first microphone 13 of the first noise control system 1 are disposed at a position close to a standard position of the right ear of the user seated in the seat on a headrest of the seat (driver's seat in the drawings) to be noise-cancelled, and the second speaker 14 and the second microphone 15 of the first noise control system 1 are disposed at a position close to a standard position of a left ear of the user seated in the seat on the headrest of the seat to be noise-cancelled.

In addition, the first speaker 12 of the second noise control system 2 is disposed in a front upper position of the standard position of the right ear of the user seated in the seat to be noise-cancelled on a ceiling of a passenger compartment of the vehicle, and the second speaker 14 of the second noise control system 2 is disposed in a front upper position of the standard position of the left ear of the user seated in the seat to be noise-cancelled on the ceiling of the passenger compartment. Further, the first microphone 13 of the second noise control system 2 is disposed at a position closer to the seat to be noise-cancelled than the first speaker 12 on the right side of the first speaker 12 on the ceiling in front of the user, and the second microphone 15 of the second noise control system 2 is disposed at a position closer to the seat to be noise-cancelled than the second speaker 14 on the left side of the second speaker 14 on the ceiling in front of the user.

As the first speaker 12 and the second speaker 14 of the second noise control system 2, super-directional parametric speakers with relatively small distance attenuation may be used.

Returning to FIG. 1, in the first noise control system 1 and the second noise control system 2, the signal processing block 11 generates a first cancel signal CA1($n$) and outputs the generated cancel signal CA1($n$) from the first speaker 12, and also generates a second cancel signal CA2($n$) and outputs the generated second cancel signal CA2($n$) from the second speaker 14 by using a noise signal x(n) representing noise generated by a noise source, a first microphone error signal err1($n$) which is an audio signal picked up by the first microphone 13, and a second microphone error signal err2($n$) which is an audio signal picked up by the second microphone 15, respectively.

Then, by the first cancel signal CA1($n$) output from the first speaker 12 of the first noise control system 1 and the second cancel signal CA2($n$) output from the second speaker 14 of the first noise control system 1, and the first cancel signal CA1($n$) output from the first speaker 12 of the second noise control system 2 and the second cancel signal CA2($n$) output from the second speaker 14 of the second noise control system 2, the noise generated by the noise source is canceled at a first cancellation point and a second cancellation point.

Figure 3:
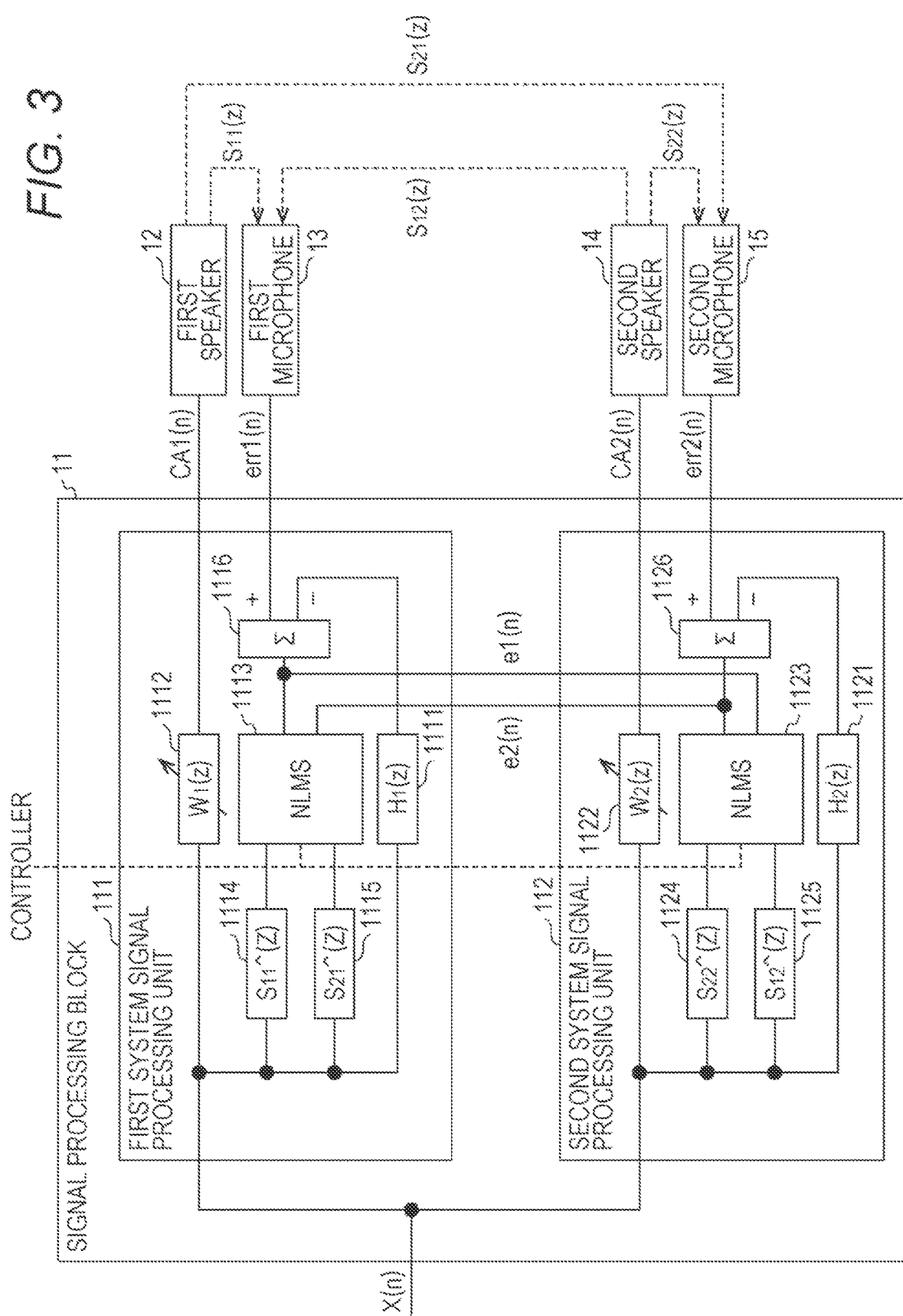
FIG. 3 is a block diagram illustrating a configuration of a signal processing block according to one form of the present disclosure.

Next, the signal processing block 11 of the first noise control system 1 and the signal processing block 11 of the second noise control system 2 have the same configuration. Then, as illustrated in FIG. 3, the signal processing block 11 mainly includes a first system signal processing unit 111 that performs processing related to the generation of the first cancel signal CA1($n$), and a second system signal processing unit 112 that mainly performs processing related to the generation of the second cancel signal CA2($n$).

Then, the first system signal processing unit 111 includes a first system auxiliary filter 1111 in which a transfer function H1 ($z$) is preset, a first system variable filter 1112, a first system adaptive algorithm execution unit 1113, and a first system first estimation filter 1114 in which a transfer function S11^($z$) is preset, a first system second estimation filter 1115 in which a transfer function S21^($z$) is preset, and a first system subtractor 1116.

In such a configuration of the first system signal processing unit 111, the input noise signal x(n) is output to the first speaker 12 as the first cancel signal CA1($n$) through the first system variable filter 1112.

Further, the input noise signal x(n) is transmitted to the first system subtractor 1116 through the first system auxiliary filter 1111, and the first system subtractor 1116 subtracts an output of the first system auxiliary filter 1111 from the first microphone error signal err1($n$) picked up by the first microphone 13, and outputs the subtracted output as an error e1 to the first system adaptive algorithm execution unit 1113 and the second system signal processing unit 112.

Next, the first system variable filter 1112, the first system adaptive algorithm execution unit 1113, the first system first estimation filter 1114, and the first system second estimation filter 1115 constitute a multiple error filtered-X adaptive filter. An estimated transfer characteristic S11^($z$) of the transfer function S11($z$) from the first system signal processing unit 111 to the first microphone 13, which is calculated by actual measurement or the like, is preset in the first system first estimation filter 1114, and the first system first estimation filter 1114 inputs the transfer characteristic S11ˆ(z) to the first system adaptive algorithm execution unit 1113 by convoluting the transfer characteristic S11ˆ(z) with the noise signal x(n). In addition, an estimated transfer characteristic S21ˆ(z) of the transfer function S21(z) representing the transfer function from the first system signal processing unit 111 to the second microphone 15, which is calculated by the actual measurement or the like, is preset in the first system second estimation filter 1115, and the first system second estimation filter 1115 inputs the transfer characteristic S21ˆ(z) to the first system adaptive algorithm execution unit 1113 by convoluting the transfer characteristic S21ˆ(z) with the noise signal x(n).

Then, the first system adaptive algorithm execution unit 1113 executes an adaptive algorithm, such as NLMS, with the noise signal x(n) with which the transfer function S11ˆ(z) is convoluted by the first system first estimation filter 1114, the noise signal x(n) with which the transfer function S21ˆ(z) is convoluted by the first system second estimation filter 1115, the error e1 output from the first system subtractor 1116, and the error e2 output from the second system signal processing unit 112 as inputs, updates coefficients of the first system variable filter 1112 so that error e1 and error e2 become 0, and adapts a transfer function W1(z).

Here, a step size that determines a magnitude of the coefficient update of the first system variable filter 1112 of the first system adaptive algorithm execution unit 1113 can be controlled by the controller 3.

The second system signal processing unit 112 also has the same configuration as the first system signal processing unit 111, and the second system signal processing unit 112 is a second system auxiliary filter 1121 in which a transfer function H2(z) is preset, a second system variable filter 1122, a second system adaptive algorithm execution unit 1123, a second system first estimation filter 1124 in which a transfer function S22ˆ(z) is preset, a second system second estimation filter 1125 in which the transfer function S12ˆ(z) is preset, and a second system subtractor 1126.

In such a configuration of the second system signal processing unit 112, the input noise signal x(n) is output to the second speaker 14 as the second cancel signal CA2(n) through the second system variable filter 1122.

Further, the input noise signal x(n) is transmitted to the second system subtractor 1126 through the second system auxiliary filter 1121, and the second system subtractor 1126 subtracts the output of the second system auxiliary filter 1121 from the first microphone error signal err2(n) picked up by the second microphone 15, and outputs the subtracted output as the error e2 to the second system adaptive algorithm execution unit 1123 and the first system signal processing unit 111.

Next, the second system variable filter 1122, the second system adaptive algorithm execution unit 1123, the second system first estimation filter 1124, and the second system second estimation filter 1125 constitute the multiple error filtered-X adaptive filter. The estimated transmission characteristic S22ˆ(z) of the transfer function S22(z) from the second system signal processing unit 112 to the second microphone 15, which is calculated by actual measurement or the like, is preset in the second system first estimation filter 1124, and the second system first estimation filter 1124 convolutes the transfer characteristic S22ˆ(z) with the input noise signal x(n) and inputs the convoluted signal to the second system adaptive algorithm execution unit 1123. In addition, the estimated transmission characteristic S12ˆ(z) of the transfer function S12(z) from the second system signal processing unit 112 to the first microphone 13, which is calculated by actual measurement or the like, is preset in the second system second estimation filter 1125, and the second system second estimation filter 1125 convolutes the transfer characteristic S12ˆ(z) with the input noise signal x(n) and inputs the convoluted signal to the second system adaptive algorithm execution unit 1123.

Then, the second system adaptive algorithm execution unit 1123 executes the adaptive algorithm, such as the NLMS, with the noise signal x(n) in which the transfer function S22ˆ(z) is convoluted by the second system first estimation filter 1124, the noise signal x(n) with which the transfer function S12ˆ(z) is convoluted by the second system second estimation filter 1125, the error e2 output from the subtractor, and the error e1 output from the first system signal processing unit 111 as the inputs, updates the coefficient of the second system variable filter 1122 so that the error e1 and the error e2 become 0, and adapts the transfer function W2(z).

Here, a step size that determines a magnitude of the coefficient update of the second system variable filter 1122 of the second system adaptive algorithm execution unit 1123 can be controlled by the controller 3.

Here, the transfer function H1(z) set in the first system auxiliary filter 1111 of the first system signal processing unit 111 and the transfer function H2(z) set in the second system auxiliary filter 1121 of the second system signal processing unit 112 are a transfer function learned and set in advance.

Hereinafter, the learning of the transfer function H1(z) of the first system auxiliary filter 1111 and the transfer function H2(z) of the second system auxiliary filter 1121 of the first noise control system 1 and the second noise control system 2 will be described below.

The learning is performed by learning and setting the transfer function H1(z) of the first system auxiliary filter 1111 and the transfer function H2(z) of the second system auxiliary filter 1121 of the first noise control system 1, and then learning and setting the transfer function H1(z) of the first system auxiliary filter 1111 and the transfer function H2(z) of the second system auxiliary filter 1121 of the second noise control system 2.

First, in the state in which the operation of the second noise control system 2 is stopped, that is, the state in which sound is not output from the first speaker 12 and the second speaker 14 of the second noise control system 2, the learning of the transfer function H1(z) of the first system auxiliary filter 1111 and the transfer function H2(z) of the second system auxiliary filter 1121 of the first noise control system 1 are performed by executing first-stage learning processing and second-stage learning processing.

Figure 4:
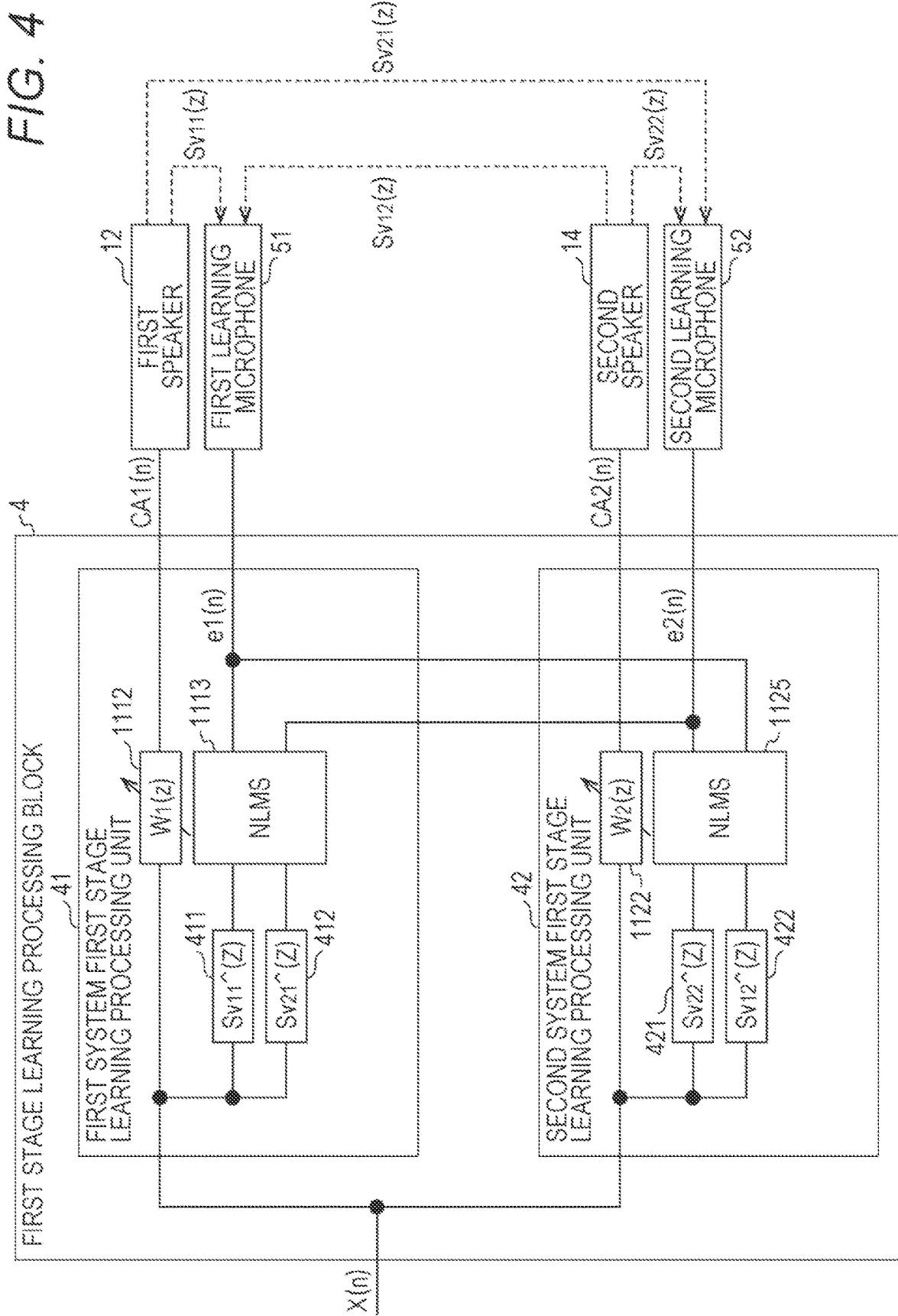
FIG. 4 is a block diagram illustrating a configuration of learning of a first stage of a transfer function of an auxiliary filter according to one form of the present disclosure.

As illustrated in FIG. 4, the first-stage learning processing of the first noise control system 1 is performed in a configuration in which the signal processing block 11 of the first noise control system 1 is replaced with the first stage learning processing block 4.

In addition, the first-stage learning processing of the first noise control system 1 is performed by connecting a first learning microphone 51 disposed at a first cancel point, which is a position of a right ear of a standard user seated in a seat to be noise-canceled, and a second learning microphone 52 disposed at a second cancel point, which is a position of a left ear of a standard user seated in a seat to be noise-canceled to the first stage learning processing block 4.

Figure 5A:
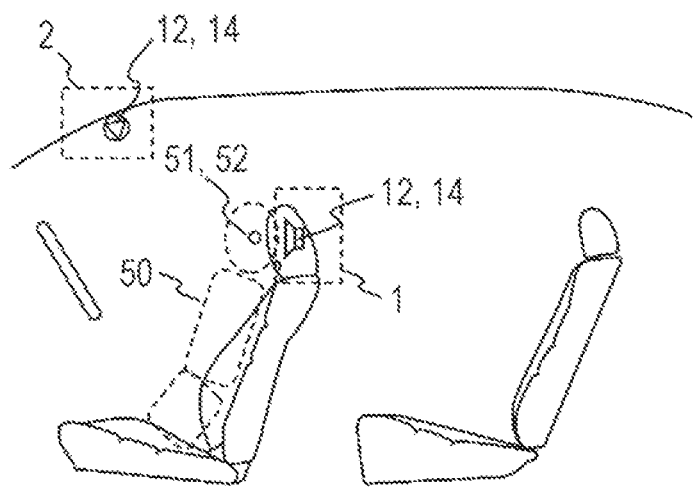
FIG. 5A and FIG. 5B are diagrams illustrating a disposition example of a learning microphone according to one form of the present disclosure.
Figure 5B:
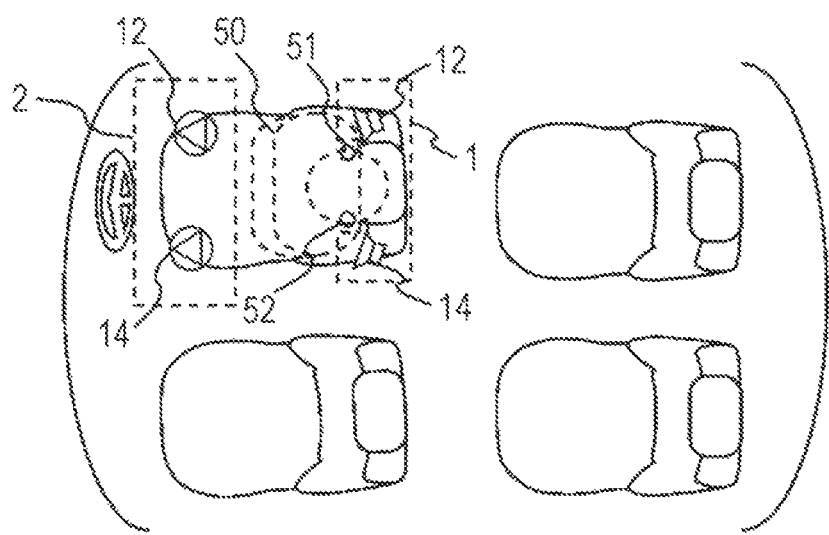

For example, as illustrated in FIGS. 5A and 5B, the disposition of the first learning microphone 51 and the second learning microphone 52 is performed by installing the first learning microphone 51 at a position of a right ear of a crash test dummy 50 seated in a seat to be noise-cancelled, installing the first learning microphone 51 at a position of a left ear of the crash test dummy 50, or the like.

Returning to FIG. 4, the first stage learning processing block 4 includes a first system first stage learning processing unit 41 and a second system first stage learning processing unit 42.

Then, the first system first stage learning processing unit 41 has a configuration in which the first system auxiliary filter 1111 and the first system subtractor 1116 are removed from the first system signal processing unit 111 of the signal processing block 11 illustrated in FIG. 3, a first system first learning estimation filter 411 in which an estimated transmission function $Sv11\hat{}(z)$ of the transmission function $Sv11(z)$ from the first system first stage learning processing unit 41 to the first learning microphone 51 is set is provided instead of the first system first estimation filter 1114, a first system second learning estimation filter 412 in which an estimated transmission function $Sv21\hat{}(z)$ of the transmission function $Sv21(z)$ from the first system first stage learning processing unit 41 to the second learning microphone 52 is set is provided instead of the first system second estimation filter 1115, and both the output of the first learning microphone 51 and the output of the second learning microphone 52 are input to the first system adaptive algorithm execution unit 1113 as errors.

Further, the second system first stage learning processing unit 42 includes a configuration in which the second system auxiliary filter 1121 and the second system subtractor 1126 are removed from the second system signal processing unit 112 of the signal processing block 11 illustrated in FIG. 3, the second system first learning estimation filter 421 in which the estimated transfer function $Sv22\hat{}(z)$ of the transfer function $Sv22(z)$ from the second system first stage learning processing unit 42 to the second learning microphone 52 is set instead of the second system first estimation filter 1124, and the second system second learning estimation filter 422 in which the estimation transfer function $Sv12\hat{}(z)$ of the transfer function $Sv12(z)$ from the second system first stage learning processing unit 42 to the first learning microphone 51 is set is provided instead of the second system second estimation filter 1125, and both the output of the first learning microphone 51 and the output of the second learning microphone 52 are input to the second system adaptive algorithm execution unit 1123 as errors.

Figure 6:
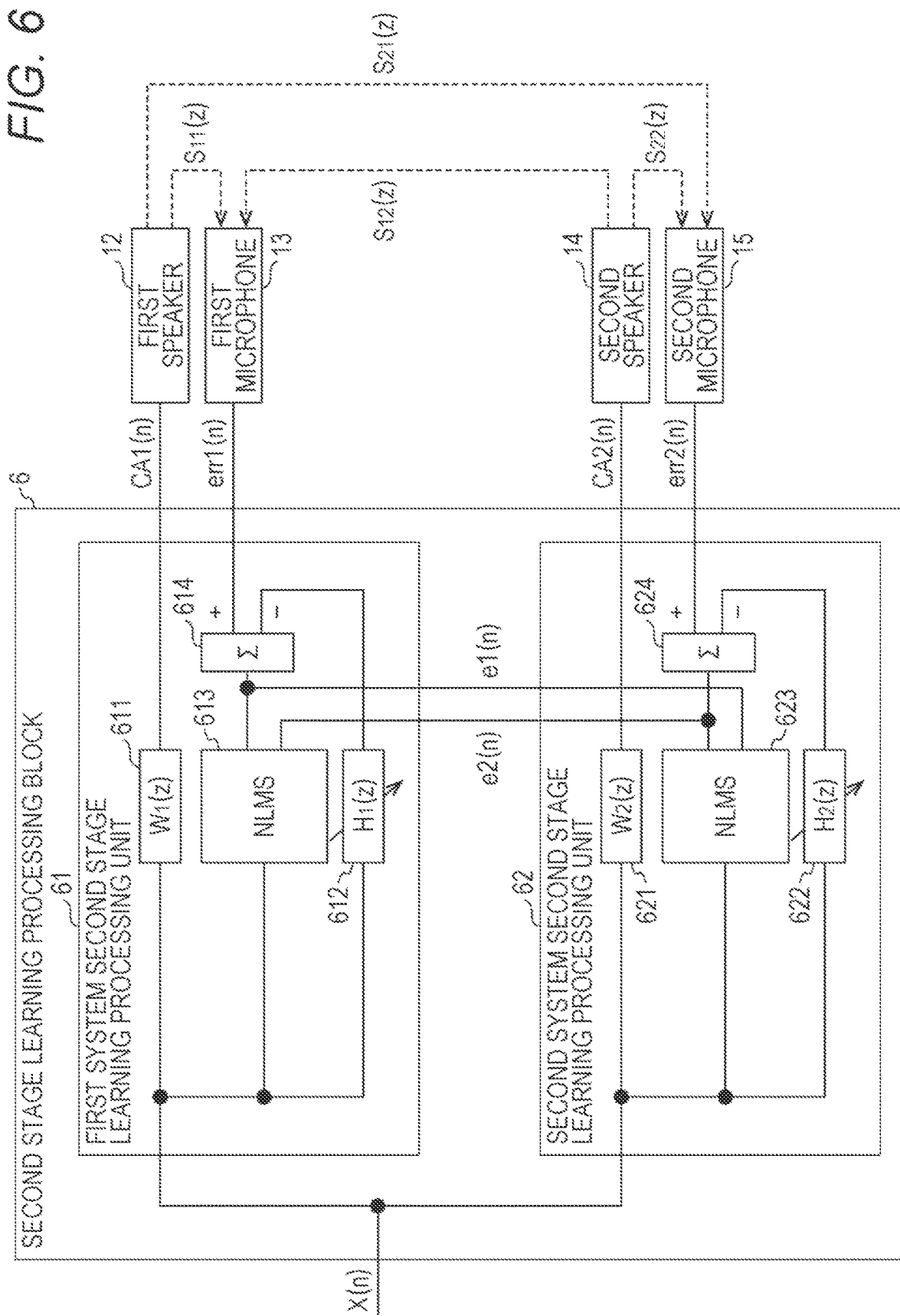
FIG. 6 is a block diagram illustrating a configuration of learning of a second stage of the transfer function of the auxiliary filter according to one form of the present disclosure.

Then, in such a configuration, the transfer function $W1(z)$ of the first system variable filter 1112 is converged and stabilized by the adaptive operation by the first system adaptive algorithm execution unit 1113, the transfer function $W2(z)$ of the second system variable filter 1122 is converged and stabilized by the adaptive operation by the second system adaptive algorithm execution unit 1123, and the converged and stabilized transfer functions $W1(z)$ and $W2(z)$ are obtained as a result of the first-stage learning processing Next, in the second-stage learning processing of the first noise control system 1, as illustrated in FIG. 6, the signal processing block 11 of the first noise control system 1 is replaced with the second stage learning processing block 6.

The second stage learning processing block 6 includes a first system second stage learning processing unit 61 and a second system second stage learning processing unit 62.

Then, the first system second stage learning processing unit 61 includes a first system fixed filter 611 in which the transfer function $W1(z)$ obtained as the result of the first-stage learning processing is set as the transfer function, a first system second stage learning variable filter 612, a first system second stage learning adaptive algorithm execution unit 613, and a first system second stage subtractor 614.

In addition, the second system second stage learning processing unit 62 includes the second system fixed filter 621 in which the transfer function $W2(z)$ obtained as the result of the first-stage learning processing is set as the transfer function, a second system second stage learning variable filter 622, a second system second stage learning adaptive algorithm execution unit 623, and a second system second stage subtractor 624.

The noise signal $x(n)$ input to the first system second stage learning processing unit 61 is output to the first speaker 12 through the first system fixed filter 611 and the noise signal $x(n)$ input to the second system second stage learning processing unit 62 is output to the second speaker 14 through the first system fixed filter 611.

In addition, the noise signal $x(n)$ input to the first system second stage learning processing unit 61 is transmitted to the first system second stage subtractor 614 through the first system second stage learning variable filter 612, and the first system second stage subtractor 614 subtracts the output of the first system second stage learning variable filter 612 from the signal picked up by the first microphone 13 and output, as the error, the subtracted output to the first system second stage learning adaptive algorithm execution unit 613 and the second system second stage learning adaptive algorithm execution unit 623 of the second system second stage learning processing unit 62.

Further, the noise signal $x(n)$ input to the second system second stage learning processing unit 62 is transmitted to the second system second stage subtractor 624 through the second system second stage learning variable filter 622, the second system second stage subtractor 624 subtracts the output of the second system second stage learning variable filter 622 from the signal picked up by the second microphone 15, and outputs the subtracted output as the error to the second system second stage learning adaptive algorithm execution unit 623 and the first system second stage learning adaptive algorithm execution unit 613 of the first system second stage learning processing unit 61.

Then, the first system second stage learning adaptive algorithm execution unit 613 of the first system second stage learning processing unit 61 updates the transfer function $H1(z)$ of the first system second stage learning variable filter 612 so that the errors input from the first system second stage subtractor 614 and the second system second stage subtractor 624 become 0, and the second system second stage learning adaptive algorithm execution unit 623 of the second system second stage learning processing unit 62 updates the transfer function $H2(z)$ of the second system second stage learning variable filter 622 so that so that the errors input from the first system second stage subtractor 614 and the second system second stage subtractor 624 become 0.

Then, in such a configuration, the transfer function $H1(z)$ of the first system second stage learning variable filter 612 is converged and stabilized by the adaptive operation by the first system second stage learning adaptive algorithm execution unit 613 and the converged and stabilized transfer function $H1(z)$ is set as the transfer function $H1(z)$ of the first system auxiliary filter 1111 of the first system signal processing unit 111 of the signal processing block 11 of the first noise control system 1, and the transfer function $H2(z)$ of the second system second stage learning variable filter 622 is converged and stabilized by the adaptive operation by the second system second stage learning adaptive algorithm execution unit 623 and the converged and stabilized transfer function $H2(z)$ is set as the transfer function $H2(z)$ of the second system auxiliary filter 1121 of the second system signal processing unit 112 of the signal processing block 11 of the first noise control system 1.

Next, the learning of the transfer function H1(z) of the first system auxiliary filter 1111 of the second noise control system 2 and the transmission function H2(z) of the second system auxiliary filter 1121 is performed in a state in which a coefficient update of the first system variable filter 1112 is stopped by setting the transfer function W1(z) obtained as the result of the first-stage learning processing of the first noise control system 1 in the first system variable filter 1112 of the first noise control system 1 which is set by learning the transfer function H1(z) of the first system auxiliary filter 1111 and the transfer function H2(z) of the second system auxiliary filter 1121 as described above, setting the transmission function W2(z) obtained as the result of the first-stage learning processing of the first noise control system 1 in the second system variable filter 1122 of the first noise control system 1, setting 0 as the step size in the first system adaptive algorithm execution unit 1113 of the first system signal processing unit 111 of the first noise control system 1, or the like, and a coefficient update of the second system variable filter 1122 is stopped by setting 0 as the step size in the second system adaptive algorithm execution unit 1123 of the second system signal processing unit 112 of the first noise control system 1.

That is, the learning of the transmission function H1(z) of the first system auxiliary filter 1111 of the second noise control system 2 and the transmission function H2(z) of the second system auxiliary filter 1121 is performed while operating the first noise control system 1 in a state in which the transmission function W1 of the first system variable filter 1112 of the first noise control system 1 is fixed to the transfer function W1(z) obtained as the result of the first-stage learning processing of the first noise control system 1, and the transfer function W2 of the second system variable filter 1122 of the first noise control system 1 is fixed to the transfer function W2(z) obtained as the result of the first-stage learning processing of the first noise control system 1.

In the first-stage learning processing of the second noise control system 2, in the configuration in which the signal processing block 11 of the first noise control system 1 is replaced with the first stage learning processing block 4 illustrated in FIG. 4, the transfer function W1(z) of the first system variable filter 1112 is converged and stabilized by the adaptive operation by the first system adaptive algorithm execution unit 1113, the transfer function W2(z) of the second system variable filter 1122 is converged and stabilized by the adaptive operation by the second system adaptive algorithm execution unit 1123, and the converged and stabilized transfer functions W1(z) and W2(z) is obtained as the result of first-stage learning processing.

In addition, in the second-stage learning processing of the second noise control system 2, in the configuration in which the signal processing block 11 of the first noise control system 1 is replaced with the second stage learning processing block 6 illustrated in FIG. 6, the transfer function W1(z) obtained as the result of first-stage learning processing is set in the first system fixed filter 611, and the transfer function W2(z) obtained as the result of the first-stage learning processing is set in the second system fixed filter 621, the transfer function H1(z) of the first system second stage learning variable filter 612 is converged and stabilized by the adaptive operation by the first system second stage learning adaptive algorithm execution unit 613, the converged and stabilized transfer function H1(z) is set as the transfer function H1(z) of the first system auxiliary filter 1111 of the first system signal processing unit 111 of the signal processing block 11 of the second noise control system 2, the transfer function H2(z) of the second system second stage learning variable filter 622 is converged and stabilized by the adaptive operation by the second system second stage learning adaptive algorithm execution unit 623, and the converged and stabilized transfer function H2(z) is set as the transfer function H2(z) of the second system auxiliary filter 1121 of the second system signal processing unit 112 of the signal processing block 11 of the second noise control system 2.

Here, in the state where the noise cancellation sound is output from the first noise control system 1, the transmission function H1(z) of the first system auxiliary filter 1111 and the transmission function H2(z) of the second system auxiliary filter 1121 of the second noise control system 2 set in this way are transfer functions that output the noise cancellation sound that cancels the noise heard by the user to the second noise control system 2 at a first cancel point that is a position of a standard right ear of a user and a second cancel point that is a position of a standard left ear of the user.

Hereinabove, the learning of the transfer function H1(z) of the first system auxiliary filter 1111 and the transfer function H2(z) of the second system auxiliary filter 1121 of the first noise control system 1 and the second noise control system 2 has been described.

Next, the control performed by the controller 3 during the actual operation of the active noise control system will be described.

Figure 7:
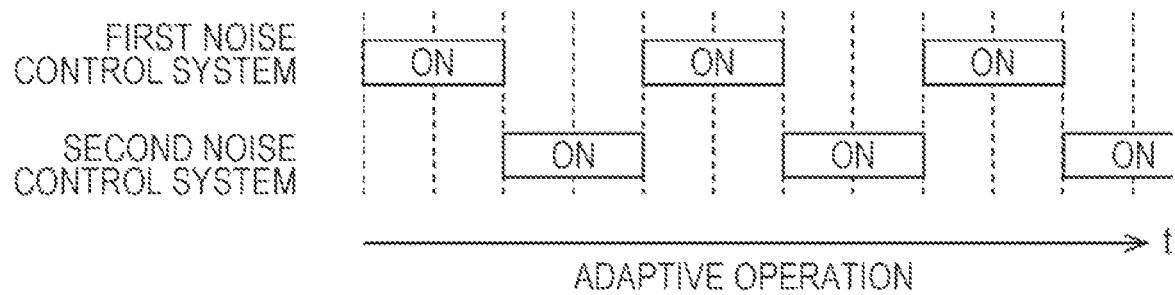
FIG. 7 is a diagram illustrating an adaptive operation of the active noise control system according to one form of the present disclosure.

As illustrated in FIG. 7A, the controller 3 controls operations of the first system adaptive algorithm execution unit 1113 and the second system adaptive algorithm execution unit 1123 of the first noise control system 1 and the first system adaptive algorithm execution unit 1113 and the second system adaptive algorithm execution unit 1123 of the second noise control system 2 so that the state of the active noise control system is alternately switched at predetermined periods between a first state in which the adaptive operation (coefficient update) of the first system variable filter 1112 and the second system variable filter 1122 is executed in the first system adaptive algorithm execution unit 1113 and the second system adaptive algorithm execution unit 1123 of the first noise control system 1 and the adaptive operation (coefficient update) of the first system variable filter 1112 and the second system variable filter 1122 is stopped in the first system adaptive algorithm execution unit 1113 and the second system adaptive algorithm execution unit 1123 of the second noise control system 2 and a second state in which the adaptive operation (coefficient update) of the first system variable filter 1112 and the second system variable filter 1122 is stopped in the first system adaptive algorithm execution unit 1113 and the second system adaptive algorithm execution unit 1123 of the first noise control system 1 and the adaptive operation (coefficient update) of the first system variable filter 1112 and the second system variable filter 1122 is executed in the first system adaptive algorithm execution unit 1113 and the second system adaptive algorithm execution unit 1123 of the second noise control system 2.

The stop of the adaptive operation (coefficient update) of the first system adaptive algorithm execution unit 1113 and the second system adaptive algorithm execution unit 1123 of the first noise control system 1, and the first system adaptive algorithm execution unit 1113 and the second system adaptive algorithm execution unit 1123 of the second noise control system 2 can be controlled by allowing the controller 3 to set the step size as 0, for example, and the execution of the adaptive operation (coefficient update) of the first system adaptive algorithm execution unit 1113 and the second system adaptive algorithm execution unit 1123 of the first noise control system 1, and the first system adaptive algorithm execution unit 1113 and the second system adaptive algorithm execution unit 1123 of the second noise control system 2 can be controlled by allowing the controller 3 to set a predetermined positive value as the step size, for example.

In this way, it is possible to exclude the interference with the adaptive operation of the first noise control system and the adaptive operation of the second noise control system 2 and performing proper adaptation in the first noise control system 1 and the second noise control system 2, respectively, by alternately performing the adaptive operation of the first system adaptive algorithm execution unit 1113 and the second system adaptive algorithm execution unit 1123 of the first noise control system 1 and the adaptive operation of the first system adaptive algorithm execution unit 1113 and the second system adaptive algorithm execution unit 1123 of the second noise control system 2.

In implementations of the present disclosure described above, since the first noise control system 1 and the second noise control system 2 use two noise control systems in which the positions of the speakers are different, the noise heard by the user can be canceled satisfactorily even if the diffraction of the noise cancellation sound of one of the noise control systems or the change of the distance attenuation of the noise cancellation sound occurs due to the change in the user's posture, or the like.

In addition, it is possible to appropriately adapt each noise control system so that the noise heard by the user is canceled by a relatively simple configuration and processing that only alternately perform adaptive operations that do not consider the path with the other noise control system in each of the two noise control systems, the first noise control system 1 and the second noise control system 2.

However, the above active noise control system includes a driver monitoring system (DMS) for detecting the state of the position of the driver's head and the like by the near infrared camera 8 or the like shown in FIG. 8*a*1, and the controller 3 may control the adaptive operation of the active noise control system according to the position of the user's head detected by the driver monitoring system.

That is, as illustrated in FIG. 8*a*1, when the user's head detected by the driver monitoring system is near the first speaker 12 and the second speaker 14 of the first noise control system 1, as illustrated in FIG. 8*a*2, for the operation of alternately repeating the first state in which the adaptive operation is executed in the first noise control system 1 and the adaptive operation is stopped in the second noise control system 2 described above, and the second state in which the adaptive operation is stopped in the first noise control system 1 and the adaptive operation is stopped in the second noise control system 2 described above, the controller 3 controls the adaptive operation of the active noise control system so that the length of each period in the first state is longer than the length of each period in the second state.

In addition, as illustrated in FIG. 8*b*1, when the user's head detected by the driver monitoring system is positioned in front of the first speaker 12 and the second speaker 14 of the first noise control system 1, as illustrated in FIG. 8*b*2, for the operation of alternately repeating the first state in which the adaptive operation is executed in the first noise control system 1 and the adaptive operation is stopped in the second noise control system 2 described above, and the second state in which the adaptive operation is stopped in the first noise control system 1 and the adaptive operation is stopped in the second noise control system 2 described above, the controller 3 controls the adaptive operation of the active noise control system so that the length of each period in the second state is longer than the length of each period in the first state.

When controlling the adaptive operation of the active noise control system in this way, as the user's head moves forward from the first speaker 12 and the second speaker 14 of the first noise control system 1, it is preferable to control the adaptive operation of the active noise control system so that the length of each period in the second state is longer and the length of each period in the first state is shorter.

Alternatively, the controller 3 may control to set the step size set in the first system adaptive algorithm execution unit 1113 and the second system adaptive algorithm execution unit 1123 of the first noise control system 1 in the first state larger than the step size set in the first system adaptive algorithm execution unit 1113 and the second system adaptive algorithm execution unit 1123 of the second noise control system 2 in the second state when the user's head detected by the driver monitoring system is near the first speaker 12 and the second speaker 14 of the first noise control system 1 while alternately switching between the second state in which the adaptive operation is stopped in the first noise control system 1 described above and the adaptive operation is stopped in the second noise control system 2 at predetermined periods, and to set the step size set in the first system adaptive algorithm execution unit 1113 and the second system adaptive algorithm execution unit 1123 of the second noise control system 2 in the second state to be larger than the step size set in the first system adaptive algorithm execution unit 1113 and the second system adaptive algorithm execution unit 1123 of the first noise control system 1 in the first state when the user's head is located forward from the first speaker 12 and the second speaker 14 of the first noise control system 1.

When controlling the adaptive operation of the active noise control system in this way, it is preferable to perform control the step size set in the first system adaptive algorithm execution unit 1113 and the second system adaptive algorithm execution unit 1123 of the second noise control system 2 in the second state to be larger and the step size set in the first system adaptive algorithm execution unit 1113 and the second system adaptive algorithm execution unit 1123 of the first noise control system 1 in the first state to be smaller as the user's head moves forward from the first speaker 12 and the second speaker 14 of the first noise control system 1.

Alternatively, the controller 3 may alternate between the first state and the second state so that as the user's head moves forward from the first speaker 12 and the second speaker 14 of the first noise control system 1, the length of each period in the second state becomes longer, the step size set in the first system adaptive algorithm execution unit 1113 and the second system adaptive algorithm execution unit 1123 of the second noise control system 2 in the second state becomes large, the length of each period in the first state becomes short, and the step size set in the first system adaptive algorithm execution unit 1113 and the second system adaptive algorithm execution unit 1123 of the first noise control system 1 in the first state becomes small.

As described above, by performing the adaptive operation of the first noise control system 1 and the adaptive operation of the second noise control system 2 according to the position of the user's head, it becomes possible to more appropriately and quickly adapt the noise control system, which is more effective by canceling the noise heard by the user, of the first noise control system 1 and the second noise control system 2.

Further, in the active noise control system according to implementations described above, the plurality of auxiliary filters are provided in each of the first system signal processing unit 111 and the second system signal processing unit 112 of the first noise control system 1, and the first system signal processing unit 111 and the second system signal processing unit 112 of the second noise control system 2, so the auxiliary filter may be switched according to the position of the user's head detected by the driver monitoring system described above.

That is, in this case, as illustrated in FIG. 9, the first system signal processing unit 111 of both the first noise control system 1 and the second noise control system 2 includes n (where n is an integer of 2 or more) first system auxiliary filters 1111 and a first system selector 1117 that outputs the output of the first system auxiliary filter 1111, which is one of the outputs of the n first system auxiliary filters 1111, to the first system subtractor 1116 according to the control of the controller 3, and the second system signal processing unit 112 of both the first noise control system 1 and the second noise control system 2 includes n second system auxiliary filters 1121 and a second system selector 1127 that outputs the output of the second system auxiliary filter 1121, which is one of the outputs of the n second system auxiliary filter 1121, to the second system subtractor 1126 according to the control of the controller 3.

An i-th first system auxiliary filter 1111 of the first system signal processing unit 111 of both the first noise control system 1 and the second noise control system 2 and both the first noise control system 1 and the second noise control system 2 and an i-th second system auxiliary filter 1121 of the second system signal processing unit 112 of both the first noise control system 1 and the second noise control system 2 correspond to an i-th cancel target head position among n preset head positions to be canceled.

Each cancel target head position is a preset position where a head of a user seated in a seat to be noise-cancelled can be positioned.

Figure 10A:
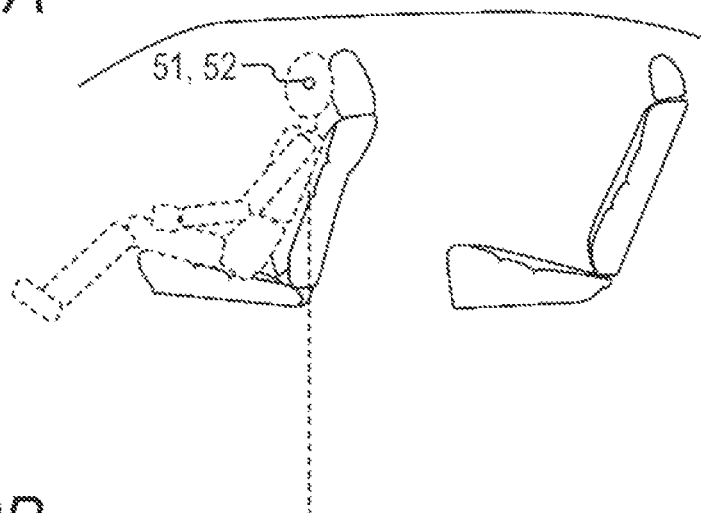
FIG. 10A, FIG. 10B, and FIG. 10C are diagrams illustrating a disposition of a learning microphone in another configuration example of the active noise control system according to one form of the present disclosure.
Figure 10B:
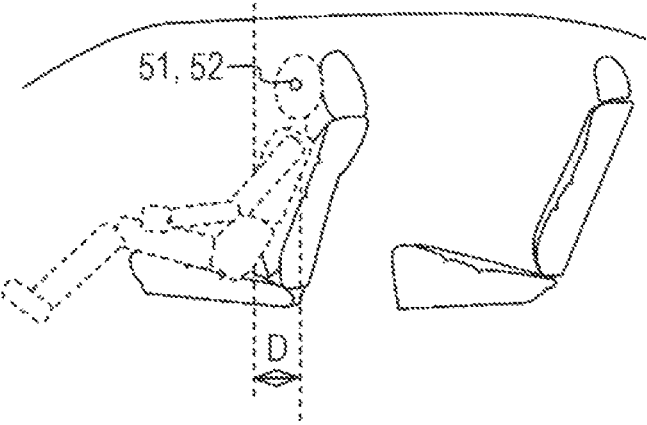
Figure 10C:
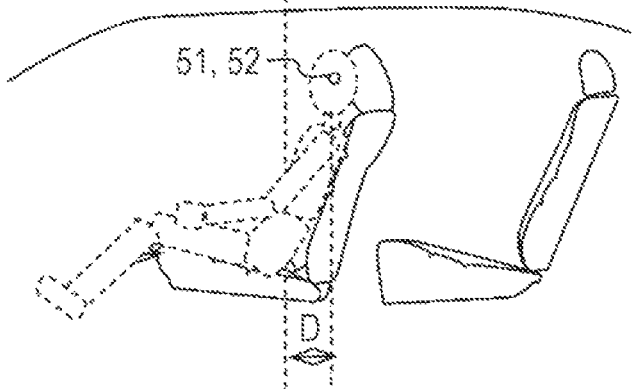

FIG. 10 illustrates an example of such a cancel target head position. In this example, the number of head positions to be canceled is set to 3. As illustrated in FIG. 10A, when the position of the seat to be noise-cancelled is set to a front position by a distance D from a standard front-rear position, the standard position of the user's head is set as a first head position to be canceled, as illustrated in FIG. 10B, when the position of the seat to be noise-cancelled is set to the standard front-rear position, the standard position of the user's head is set as a second head position to be canceled, and as illustrated in FIG. 10C, when the position of the seat to be noise-cancelled is set to a back position by a distance D from the standard front-rear position, the standard position of the user's head is set as a third head position to be canceled.

Then, the learning of the transfer functions of the i-th first system auxiliary filter 1111 of the first system signal processing unit 111 of both the first noise control system 1 and the second noise control system 2 and the i-th second system auxiliary filter 1121 of the second system signal processing unit 112 of both the first noise control system 1 and the second noise control system 2 is performed in the same manner as the learning in the above-described implementations except that the first-stage learning processing is performed by disposing the first learning microphone 51 at the position of the standard user's right ear when the head is at the i-th cancel target head position and disposing the second learning microphone 52 at the standard user's left ear position when the head is at the i-th cancel target head position as illustrated in FIG. 10

Then, the controller 3 calculates the position of the head to be canceled closest to the position of the user's head detected by the driver monitoring system, and when the calculated head position to be canceled changes, allows the first system selector 1117 of the first system signal processing unit 111 of the first noise control system 1 and the second noise control system 2 to switch the output transmitted to the first system subtractor 1116 to the output of the first system auxiliary filter 1111 corresponding to the calculated cancel target head position and allows the second system selector 1127 of the second system signal processing unit 112 of the first noise control system 1 and the second noise control system 2 to switch the output transmitted to the second system subtractor 1126 to the output of the second system auxiliary filter 1121 corresponding to the calculated cancel target head position.

Here, in implementations described above, the noise signal x(n) input to the active noise control system may be an audio signal output from the noise source, an audio signal from which the noise of the noise source is picked up by a noise microphone separately provided, or a signal that simulates the noise of each noise source generated by a simulated sound generator separately provided.

That is, for example, when the engine is used as a noise source, the engine sound picked up by the noise microphone separately provided may be set as the noise signal x(n), or the simulated sound that simulates the generated engine sound by the simulated sound generator provided separately may be set as the noise signal x(n).

Further, the implementations described above illustrate the case where there is only one noise source, but the implementations described above can be applied even when there is a plurality of noise sources by extending the configuration of the signal processing block 11 to take into account the propagation of each noise source to each cancellation point.

It is intended that the foregoing detailed description be regarded as illustrative rather than limiting, and that it be understood that it is the following claims, including all equivalents, that are intended to define the spirit and scope of this disclosure.

What is claimed is:

1. An active noise control system that reduces noise, comprising:
a plurality of noise control systems; and
a controller,
wherein each noise control system of the plurality of noise control systems includes one or more signal processing systems,
wherein each signal processing system includes:
a speaker that is configured to output noise cancellation sound,
a microphone that is configured to detect an error signal,
an auxiliary filter corresponding to a noise cancellation position, and
an adaptive filter,
wherein the auxiliary filter of each signal processing system is configured to generate, from a noise signal representing the noise, a correction signal that corrects the error signal detected by the microphone so that a difference between the noise cancellation position corresponding to the auxiliary filter and a position of the microphone is compensated, wherein the adaptive filter of each signal processing system is configured to perform adaptive operations using each error signal corrected by the correction signals generated by the auxiliary filter of each signal processing system of the same noise control system as the signal processing system, and to generate the noise cancellation sound from the noise signal, wherein the speakers of each signal processing system of each noise control system of the plurality of noise control systems are disposed at different positions from each other, and wherein the controller is configured to alternately perform the adaptive operations of the adaptive filters of each signal processing system of each noise control system of the plurality of noise control systems so that the adaptive operations of the adaptive filters of different noise control systems are not performed at the same time, and the adaptive operations of the adaptive filters of each signal processing system of the same noise control system are performed at the same time.

2. The active noise control system according to claim 1, wherein:

the plurality of noise control systems includes two noise control systems, a first noise control system and a second noise control system, in a state in which an output of noise cancellation sound from the speakers of each signal processing system of the second noise control system is stopped under a predetermined standard environment, a transfer function that generates, from the noise signal, the correction signal that corrects the error signal detected by a microphone is preset in the auxiliary filters of each signal processing system of the first noise control system so that a difference in the position between the microphone of the signal processing system and the noise cancellation position corresponding to the auxiliary filter is compensated, and in a state in which the adaptive operations of the adaptive filters of each signal processing system of the first noise control system are stopped and the transfer function of the adaptive filter is fixed to a predetermined transfer function under the standard environment, the transfer function that generates, from the noise signal, the correction signal that corrects the error signal detected by the microphone is preset in the auxiliary filters of each signal processing system of the second noise control system so that the difference in the position between the microphone of the signal processing system and the noise cancellation position corresponding to the auxiliary filter is compensated.

3. The active noise control system according to claim 1, wherein:

the plurality of noise control systems includes two noise control systems, a first noise control system and a second noise control system are provided, each of the noise control system includes two signal processing systems, a first signal processing system and a second signal processing system, the active noise control system is mounted on a vehicle, the noise cancellation position corresponding to the auxiliary filter of the first signal processing system is set to a position of a right ear of a standard human body seated in a predetermined seat of the vehicle, and the noise cancellation position corresponding to the auxiliary filter of the second signal processing system is set to a position of a left ear of the standard human body seated in the predetermined seat of the vehicle.

4. The active noise control system according to claim 3, further comprising:

a detection unit configured to detect the position of the head of the user seated in the predetermined seat, wherein the controller is configured to alternatively execute the adaptive operations of the adaptive filters of each noise control system so that an execution period of the adaptive operation of the adaptive filter of the second noise control system becomes longer and the execution period of the adaptive operation of the adaptive filter of the first noise control system becomes shorter when the position of the head of the user detected by the detection unit is in a second region and closer to the speaker of the second noise control system than the speaker of the first noise control system.

5. The active noise control system according to claim 4, wherein:

the controller is configured to control step sizes of each adaptive filter so that a step size of the adaptive filter of the second noise control system that is configured to determine a gain of a transfer function update of the adaptive filter in the adaptive operation of the adaptive filter becomes larger and a step size of the adaptive filter of the first noise control system becomes smaller when the position of the head of the user detected by the detection unit is closer to a second region than the first region.

6. The active noise control system according to claim 5, wherein:

the speakers of the first signal processing system and the second signal processing system of the first noise control system are disposed in the predetermined seat, and the speakers of the first signal processing system and the second signal processing system of the second noise control system are disposed on a ceiling of a passenger compartment of the vehicle in front of the predetermined seat.

7. The active noise control system according to claim 3, further comprising:

a detection unit configured to detect the position of the head of the user seated in the predetermined seat, wherein the controller is configured to control a step size of the adaptive filter of the second noise control system so that a step size of the adaptive filter of the second noise control system that is configured to determine a gain of a transfer function update of the adaptive filter in the adaptive operation of the adaptive filter becomes larger and a step size of the adaptive filter of the first noise control system becomes smaller when the position of the head of the user detected by the detection unit is closer to a second region near the speaker of the second noise control system than a first region near the speaker of the first noise control system.

8. The active noise control system according to claim 7, wherein:

the speakers of the first signal processing system and the second signal processing system of the first noise control system are disposed in the predetermined seat, and the speakers of the first signal processing system and the second signal processing system of the second noise control system are disposed on a ceiling of a passenger compartment of the vehicle in front of the predetermined seat.

9. The active noise control system according to claim 8, wherein:

in a state in which the output of noise cancellation sound from the speaker of the second noise control system is stopped under the predetermined standard environment, the transfer function that generates, from the noise signal, the correction signal that corrects the error signal detected by the microphone is preset in the auxiliary filters of each noise control system of the first signal processing system and the second signal processing system of the first noise control system so that the difference in the position between the microphone of the signal processing system and the noise cancellation position corresponding to the auxiliary filter is compensated, and in a state in which the adaptive operations of the adaptive filters of the first noise control system are stopped and the transfer function of the adaptive filter is fixed to a predetermined transfer function under the standard environment, the transfer function that generates, from the noise signal, the correction signal that corrects the error signal detected by the microphone is preset in the auxiliary filters of each signal processing system of the first signal processing system and the second signal processing system of the second noise control system so that the difference in the position between the microphone of the signal processing system and the noise cancellation position corresponding to the auxiliary filter is compensated.

10. The active noise control system according to claim 1, wherein:

the plurality of noise control systems includes two noise control systems, a first noise control system and a second noise control system are provided, the active noise control system is mounted on a vehicle and reduces noise heard by a user seated in a predetermined seat of the vehicle, each signal processing system of the first noise control system and the second noise control system includes:
a plurality of auxiliary filters that correspond to different noise cancellation positions from each other, and
a selector that is configured to select a correction signal generated by one of the auxiliary filters of the plurality of auxiliary filters as a correction signal used for correction of the error signal, and with respect to each signal processing system, the controller is configured to direct the selector to select a correction signal generated by an auxiliary filter corresponding to a noise cancellation position that matches a position of a head of the user seated in the seat.

11. The active noise control system according to claim 10, further comprising:

a detection unit is configured to detect a position of a head of a user seated in the predetermined seat, wherein the controller is configured to alternatively execute the adaptive operations of the adaptive filters of each noise control system so that an execution period of the adaptive operation of the adaptive filter of the second noise control system becomes longer and the execution period of the adaptive operation of the adaptive filter of the first noise control system becomes shorter when the position of the head of the user detected by the detection unit is closer to a second region near the speaker of the second noise control system than the position of the head of the user is with respect to a first region near the speaker of the first noise control system.

12. The active noise control system according to claim 11, wherein:

the controller is configured to control step sizes of each of the adaptive filters so that a step size of the adaptive filter of the second noise control system that is configured to determine a gain of a transfer function update of the adaptive filter in the adaptive operation of the adaptive filter becomes larger and a step size of the adaptive filter of the first noise control system becomes smaller when the position of the head of the user detected by the detection unit is closer to a second region than the first region.

13. The active noise control system according to claim 12, wherein:

the speakers of the first signal processing system and the second signal processing system of the first noise control system are disposed in the predetermined seat, and the speakers of the first signal processing system and the second signal processing system of the second noise control system are disposed on a ceiling of a passenger compartment of the vehicle in front of the predetermined seat.

14. The active noise control system according to claim 13, wherein in a state in which the output of noise cancellation sound from the speaker of the second noise control system is stopped under the predetermined standard environment, the transfer function that generates, from the noise signal, the correction signal that corrects the error signal detected by the microphone is preset in the auxiliary filters of each noise control system of the first signal processing system and the second signal processing system of the first noise control system so that the difference in the position between the microphone of the signal processing system and the noise cancellation position corresponding to the auxiliary filter is compensated, and in a state in which the adaptive operations of the adaptive filters of the first noise control system are stopped and the transfer function of the adaptive filter is fixed to a predetermined transfer function under the standard environment, the transfer function that generates, from the noise signal, the correction signal that corrects the error signal detected by the microphone is preset in the auxiliary filters of each signal processing system of the first signal processing system and the second signal processing system of the second noise control system so that the difference in the position between the microphone of the signal processing system and the noise cancellation position corresponding to the auxiliary filter is compensated.

15. The active noise control system according to claim 10, further comprising:

a detector is configured to detect a position of a head of a user seated in the predetermined seat, wherein the controller is configured to control a step size of each of the adaptive filters of the second noise control system such that the step size determining a gain of the transfer function update of the adaptive filter in the adaptive operation of the adaptive filter of the second noise control system is larger and the step size of the adaptive filter of the first noise control system is smaller when the position of the head of the user detected by the detector is closer to the second area near the speaker of the second noise control system than the position of the head of the user in the first area closer near the speaker of the first noise control system.

* * * * *